United States Patent
Zaccardi et al.

(10) Patent No.: US 11,125,091 B2
(45) Date of Patent: Sep. 21, 2021

(54) AIRCRAFT TURBO MACHINE EXIT GUIDE VANE COMPRISING A BENT LUBRICANT PASSAGE OF IMPROVED DESIGN

(71) Applicant: SAFRAN AIRCRAFT ENGINES, Paris (FR)

(72) Inventors: Cédric Zaccardi, Moissy-Cramayel (FR); Christophe Marcel Lucien Perdrigeon, Moissy-Cramayel (FR); Mohamed-Lamine Boutaleb, Moissy-Cramayel (FR); Sébastien Vincent François Dreano, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 121 days.

(21) Appl. No.: 16/462,264

(22) PCT Filed: Nov. 28, 2017

(86) PCT No.: PCT/FR2017/053265
§ 371 (c)(1),
(2) Date: May 20, 2019

(87) PCT Pub. No.: WO2018/100278
PCT Pub. Date: Jun. 7, 2018

(65) Prior Publication Data
US 2019/0338661 A1    Nov. 7, 2019

(30) Foreign Application Priority Data
Nov. 29, 2016 (FR) ...................................... 16 61643

(51) Int. Cl.
*F01D 5/18* (2006.01)
*F01D 9/06* (2006.01)
(Continued)

(52) U.S. Cl.
CPC .............. *F01D 9/065* (2013.01); *F01D 5/185* (2013.01); *F01D 5/188* (2013.01); *F01D 25/162* (2013.01);
(Continued)

(58) Field of Classification Search
CPC .... F01D 5/185; F02C 7/14; F02C 7/18; F28D 1/0256; F28F 1/40; F28F 7/02; F02K 3/115
See application file for complete search history.

(56) References Cited

U.S. PATENT DOCUMENTS 5,669,759 A * 9/1997 Beabout .................. F01D 5/187
416/97 R
7,775,769 B1 * 8/2010 Liang ...................... F01D 25/12
416/97 R
(Continued)

FOREIGN PATENT DOCUMENTS

FR   2989110 B1   9/2016
GB   1358076 A    6/1974
WO   2016156743 A1 10/2016

OTHER PUBLICATIONS

Search Report issued in French Patent Application No. 16 61643 dated, Jun. 2017.
(Continued)

*Primary Examiner* — Woody A Lee, Jr.
(74) *Attorney, Agent, or Firm* — Pearne & Gordon LLP

(57) ABSTRACT

The invention relates to a guide vane for a bypass aircraft turbomachine, its aerodynamic part comprising a first lubricant cooling interior passage in which heat transfer structures are arranged and a second lubricant cooling interior passage in which heat transfer structures are arranged, the aerodynamic part comprising a bent area connecting a lubricant output end of the first interior passage to a lubricant input end of the second passage, the bent area extending
(Continued)

along a curved generatrix and being partly delimited by the intrados wall and the extrados wall of the vane. According to the invention, the bent area comprises one or more lubricant guide(s) arranged between the intrados and extrados walls of the vane, and each extending substantially parallel to the curved generatrix of the bent area.

12 Claims, 6 Drawing Sheets

(51) Int. Cl.
    *F01D 25/16*     (2006.01)
    *F02C 7/14*     (2006.01)
    *F02C 7/18*     (2006.01)
    *F02K 3/115*     (2006.01)
    *F28D 1/02*     (2006.01)
    *F28F 1/40*     (2006.01)
    *F28F 7/02*     (2006.01)
    *F28D 21/00*     (2006.01)

(52) U.S. Cl.
    CPC .................. *F02C 7/14* (2013.01); *F02C 7/18* (2013.01); *F02K 3/115* (2013.01); *F28D 1/0246* (2013.01); *F28F 1/40* (2013.01); *F28F 7/02* (2013.01); *F05D 2260/213* (2013.01); *F05D 2260/22141* (2013.01); *F28D 2021/0021* (2013.01)

(56) References Cited

U.S. PATENT DOCUMENTS

| | | | | |
|---|---|---|---|---|
| 7,785,072 | B1* | 8/2010 | Liang | F01D 5/187 416/97 R |
| 8,616,834 | B2 | 12/2013 | Knight, III et al. | |
| 8,757,961 | B1* | 6/2014 | Liang | F01D 5/185 415/115 |
| 8,821,111 | B2* | 9/2014 | Gear | F01D 5/187 415/115 |
| 10,519,781 | B2* | 12/2019 | Spangler | F01D 5/187 |
| 2006/0042223 | A1* | 3/2006 | Walker | F01D 25/162 60/39.08 |
| 2011/0103932 | A1* | 5/2011 | Dueckershoff | F01D 9/041 415/115 |
| 2012/0210715 | A1* | 8/2012 | Shibata | F01D 5/141 60/670 |
| 2016/0146038 | A1* | 5/2016 | Vandeputte | F01D 9/045 415/160 |
| 2017/0204879 | A1* | 7/2017 | Zaccardi | F01D 9/065 |
| 2017/0284417 | A1* | 10/2017 | Zaccardi | F02C 7/14 |
| 2018/0003066 | A1* | 1/2018 | Green | F01D 25/18 |
| 2018/0023406 | A1* | 1/2018 | Zaccardi | F01D 5/185 415/115 |
| 2018/0149027 | A1* | 5/2018 | Yang | F01D 9/041 |
| 2018/0258779 | A1* | 9/2018 | Boutaleb | F01D 9/041 |
| 2018/0298760 | A1* | 10/2018 | Subramaniyan | F01D 9/041 |
| 2018/0298912 | A1* | 10/2018 | Hall | F01D 5/20 |
| 2018/0306042 | A1* | 10/2018 | Zaccardi | F02K 3/115 |
| 2019/0078446 | A1* | 3/2019 | Scharl | F01D 5/188 |
| 2019/0078452 | A1* | 3/2019 | Zaccardi | F02K 3/06 |
| 2019/0186293 | A1* | 6/2019 | Boutaleb | F01D 25/12 |
| 2019/0249558 | A1* | 8/2019 | Zaccardi | F04D 29/582 |

OTHER PUBLICATIONS

International Search Report issued in Application No. PCT/FR2017/053265 dated Mar. 6, 2018.
Written Opinion issued in Application No. PCT/FR2017/053265 dated Mar. 6, 2018.

* cited by examiner even of the
AIRCRAFT TURBO MACHINE EXIT GUIDE VANE COMPRISING A BENT LUBRICANT PASSAGE OF IMPROVED DESIGN This is the National Stage application of PCT international application PCT/FR2017/053265, filed on Nov. 28, 2017 entitled "AIRCRAFT TURBO MACHINE EXIT GUIDE VANE COMPRISING A BENT LUBRICANT PASSAGE OF IMPROVED DESIGN", which claims the priority of French Patent Application No. 16 61643 filed Nov. 29, 2016, both of which are incorporated herein by reference in their entirety.

TECHNICAL FIELD

The present invention relates to the field of bypass aircraft turbomachines, and in particular to the design of the guide vanes arranged in all or part of an air flow of a fan of the turbomachine.

These are preferably outlet guide vane (OGV), provided to straighten the air flow at the outlet of the fan. Alternatively or simultaneously, guide vanes could, if necessary, be placed at the inlet of the fan. The guide vanes are conventionally arranged in the secondary flow path of the turbomachine.

The invention relates preferably to an aircraft turbojet engine equipped with such outlet guide vanes.

STATE OF THE PRIOR ART

On some bypass turbomachines, it is known to implant outlet guide vanes downstream of the fan to straighten the flow that escapes therefrom, and also possibly to fulfill a structural function. This last function indeed aims to allow passage of the forces from the center of the turbomachine to an outer shroud located in the extension of the fan casing. In this case, an engine attachment is conventionally arranged on or in the vicinity of this outer shroud, to ensure the fastening between the turbomachine and an attachment pylon of the aircraft.

Recently, it has also been proposed to assign an additional function to the outlet guide vanes. It is a function of heat exchanger between the outside air passing through the ring of outlet guide vanes, and a lubricant circulating inside these vanes. This heat exchanger function is for example known from document U.S. Pat. No. 8,616,834 or from document FR 2 989 110.

The lubricant intended to be cooled by the outlet guide vanes can come from different areas of the turbomachine. It may be indeed a lubricant circulating through chambers for lubricating rolling bearings that support the drive shafts and/or the fan hub, or a lubricant dedicated to the lubrication of the mechanical transmission elements of the Accessory Geared Box (AGB). Finally, it can also be used to lubricate a reduction gear for driving the fan, when such a reduction gear is provided on the turbomachine in order to reduce the speed of rotation of its fan.

The increasing needs for a lubricant require adapting accordingly the heat dissipation capacity associated with the exchangers intended for the cooling of the lubricant. The fact of assigning a heat exchanger role to the outlet guide vanes, as in the solutions of the two documents mentioned above, makes it possible in particular to reduce or even eliminate the conventional exchangers of the ACOC type (Air Cooled Oil Cooler). Since these ACOC exchangers are generally arranged in the secondary flow path, their reduction/suppression makes it possible to limit the disturbances of the secondary flow, and thus to increase the overall efficiency of the turbomachine.

The heat exchanger function is obtained on the vane by providing one or more interior passage(s) within this vane, and by implanting heat transfer means within these passages delimited by the intrados wall and the extrados wall. When two passages are provided respectively for the forward path of the lubricant in the vane, and for the backward path thereof, a bent area connects these two passages. The bent area is generally left free to limit the pressure drops that could cause the presence of heat transfer means of the type of those implanted in the interior passages connected by this bent area.

However, this bent area is likely to be the seat of a phenomenon of re-circulation of the lubricant at the outlet of the interior passage, due to the gross sectional break between this enlarged recessed area, and the end of the interior passage structured by the presence of the heat transfer means. The lubricant is indeed subject to a loss of rate in some parts of the bent area, which causes re-circulations of the lubricant disturbing the flowing thereof.

In addition, the absence of heat transfer means in the bent area substantially reduces the overall heat exchange capacity of the vane, and reduces the mechanical resistance of this area, which is nevertheless subjected to high lubricant pressures (for example tens of bars).

SUMMARY OF THE INVENTION

In order to at least partially address these problems, the invention firstly relates to a guide vane intended to be arranged in all or part of an air flow of a bypass aircraft turbomachine fan, the guide vane comprising a root, a tip as well as an aerodynamic flow straightening part arranged between the root and the tip of the vane, said aerodynamic part of the vane including a first lubricant cooling interior passage in which heat transfer means are arranged, the first interior passage extending along a first main flowing direction of the lubricant from the root to the tip of the vane, said first interior passage being partly delimited by an intrados wall and an extrados wall of the vane, the aerodynamic part also including a second lubricant cooling interior passage in which heat transfer means are arranged, the second interior passage extending along a second main flowing direction of the lubricant from the tip to the root of the vane, said second interior passage being partly delimited by the intrados wall and the extrados wall of the vane.

According to the invention, the aerodynamic part comprises a bent area connecting one end of the first interior passage to one end of the second passage, the bent area extending along a curved generatrix and being partly delimited by the intrados wall and the extrados wall of the vane. In addition, the bent area comprises at least one lubricant guide arranged between the intrados wall and the extrados wall of the vane, and each extending substantially parallel to the curved generatrix of the bent area.

Thanks to the presence of the lubricant guide(s), the recirculation of the lubricant is advantageously avoided. In addition, the guide(s) reinforce(s) heat transfers due to the increase of the wet surface by the lubricant, just as they are likely to improve the mechanical strength of the bent area.

The invention has furthermore at least one of the following optional characteristics, taken separately or in combination.

Preferably, the end of the first passage is a lubricant output end, and the end of the second interior passage is a lubricant input end. A converse solution can of course be considered, without departing from the scope of the invention.

Each lubricant guide is a wall having a first end facing for example the lubricant output end, of the first interior passage, and a second end facing for example the lubricant input end, of the second interior passage.

Preferably, each lubricant guide includes, between its first and its second end, at least one wall interruption forming a space separating two wall segments. The design in wall segments spaced from each other increases the convection phenomenon, and constitutes a simple solution for promoting the discharge of powders in case of additive manufacturing of the lubricant guides.

Preferably, each lubricant guide includes, between its first and its second end, a plurality of wall interruptions each forming a space separating two wall segments.

Preferably, for any two lubricant guides directly consecutive along a spanwise direction of the vane, the wall segments are arranged in a staggered manner. This makes it possible to further increase the convection phenomenon.

For example, for each lubricant guide, the number of wall segments is comprised between 2 and 40. In this regard, it is noted that the number of segments depends in particular on the desired mechanical resistance, on the mass allocated for the guides and/or on their method of manufacture.

Preferably, the lubricant guides define therebetween lubricant passage channels, and the guides are spaced from each other along spacing distances, at least two of which being different. Consequently, in this case, the width of the passage channels may differ, which allows locally adapting to the thickness of the bent area in order for example to present channels all having substantially equivalent sections in terms of surface area. This results in a better balancing of lubricant flow rates in each of the passage channels.

Preferably, each lubricant guide is a wall connecting the intrados wall to the extrados wall, and in any cross-section of the bent area, said wall forming the lubricant guide is inclined locally with respect to a normal to each of the intrados and extrados walls. This makes it possible to implement an additive manufacturing according to conventional methods and principles for the bent area and the part of the vane that surrounds it.

Nevertheless, it is noted that each lubricant guide could be a wall connecting the intrados wall to the extrados wall, whatever the inclination of this wall. This feature allows enhancing the mechanical strength of the vane at the bent area subjected to the high lubricant pressures.

Preferably, the number of lubricant guides is comprised between 1 and 10. This number depends in particular on the dimensions of the bent area and on the thickness of material forming the guides.

Finally, the invention also relates to an aircraft turbomachine, preferably a turbojet engine, comprising a plurality of guide vanes arranged downstream or upstream of a fan of the turbomachine, said vanes having preferably a structural function. In this manner, the vanes are capable of ensuring the passage of forces from the center of the turbomachine to an outer shroud located in the extension of the fan casing.

Other advantages and characteristics of the invention will become apparent in the detailed non-limiting description below.

BRIEF DESCRIPTION OF THE DRAWINGS

This description will be made with reference to the appended drawings among which.

DETAILED DESCRIPTION OF PREFERRED EMBODIMENTS

Figure 1:
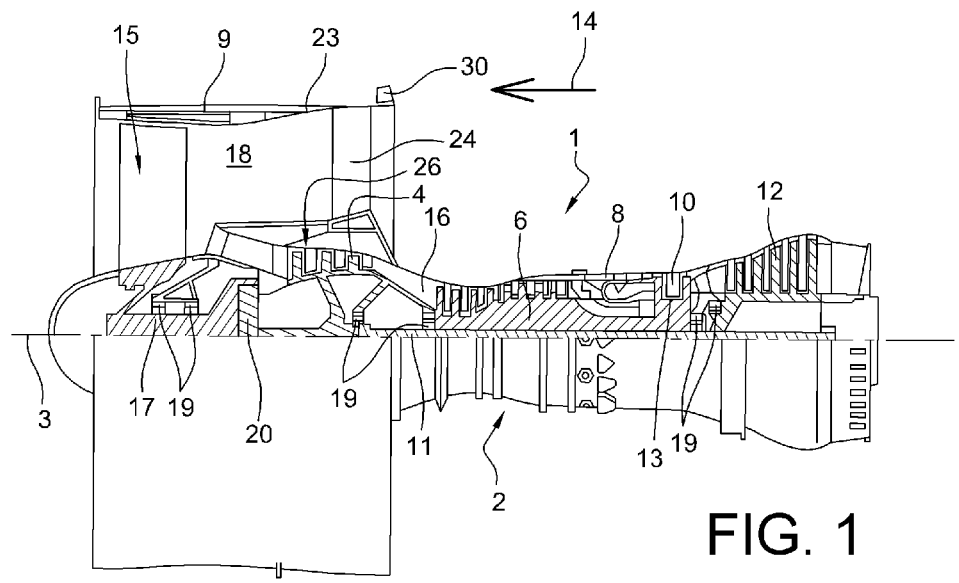
FIG. 1 represents a schematic side view of a turbojet engine according to the invention.

FIG. 1 represents a bypass two-spool turbojet engine 1, having a high by-pass ratio. The turbojet engine 1 includes, in a conventional manner, a gas generator 2 on each side of which a low-pressure compressor 4 and a low-pressure turbine 12 are arranged, this gas generator 2 comprising a high-pressure compressor 6, a combustion chamber 8 and a high-pressure turbine 10. Thereafter, the terms "front" and "rear" are considered along a direction 14 opposite to the gas flowing main direction the within the turbojet engine, this direction 14 being parallel to the axis longitudinal 3 thereof. However, the terms "upstream" and "downstream" are considered along the gas flowing main direction within the turbojet engine.

The low-pressure compressor 4 and the low-pressure turbine 12 form a low-pressure body, and are connected to each other by a low-pressure shaft 11 centered on the axis 3. Likewise, the high-pressure compressor 6 and the high-pressure turbine 10 form a high-pressure body, and are connected to each other by a high-pressure shaft 13 centered on the axis 3 and arranged around the low-pressure shaft 11. The shafts are supported by rolling bearings 19, which are lubricated by being arranged in oil chambers. The same applies for the fan hub 17, also supported by rolling bearings 19.

The turbojet engine 1 also includes, at the front of the gas generator 2 and of the low-pressure compressor 4, a single fan 15 which is here arranged directly at the rear of an air intake cone of the engine. The fan 15 is rotatable along the axis 3, and surrounded by a fan casing 9. In FIG. 1, it is not driven directly by the low-pressure shaft 11, but only driven indirectly by this shaft via a reduction gear 20, thereby allowing it to rotate at a slower speed. Nevertheless, a solution for direct drive of the fan 15 by the low-pressure shaft 11 falls within the context of the invention.

In addition, the turbojet engine 1 defines a primary flow path 16 intended to be traversed by a primary flow, and a secondary flow path 18 intended to be traversed by a secondary flow located radially outwards relative to the primary flow, the flow of the fan being therefore divided. As is known to those skilled in the art, the secondary flow path 18 is delimited radially outwards partly by an outer, preferably metal, shroud 23 extending the fan casing 9 rearwards.

Although this has not been represented, the turbojet engine 1 is equipped with a set of pieces of equipment, for example of the type fuel pump, hydraulic pump, alternator, starter, variable stator vane (VSV) actuator, discharge valve actuator, or electric power generator. It is in particular a piece of equipment for lubricating the lubrication gear 20. These pieces of equipment are driven by an accessory geared box or AGB (not represented), which is also lubricated.

Downstream of the fan 15, in the secondary flow path 18, there is provided a ring of guide vanes which are here outlet guide vanes 24 (or OGV). These stator vanes 24 connect the outer shroud 23 to a casing 26 surrounding the low-pressure compressor 4. They are circumferentially spaced from each other, and enable the secondary flow to be straightened after passing through the fan 15. In addition, these vanes 24 may also fulfill a structural function, as it is the case in the exemplary embodiments presently described. They ensure the transfer of forces originating from the reduction gear and the rolling bearings 19 from the drive shafts and the fan hub to the outer shroud 23. Then, these forces can transit through a motor attachment 30 fastened to the shroud 23 and connecting the turbojet engine to an attachment pylon (not represented) of the aircraft.

Finally, the outlet guide vanes 24 ensure, in the exemplary embodiments described here, a third function of heat exchanger between the secondary air flow passing through the ring of vanes, and a lubricant circulating inside these vanes 24. The lubricant intended to be cooled by the outlet guide vanes 24 is the one used to lubricate the rolling bearings 19, and/or the pieces of equipment of the turbojet engine, and/or the accessory geared box and/or the reduction gear 20. These vanes 24 are thus part of the fluid system(s) in which the lubricant is circulated in order to successively lubricate the associated element(s), and then to be cooled.

Figure 2:
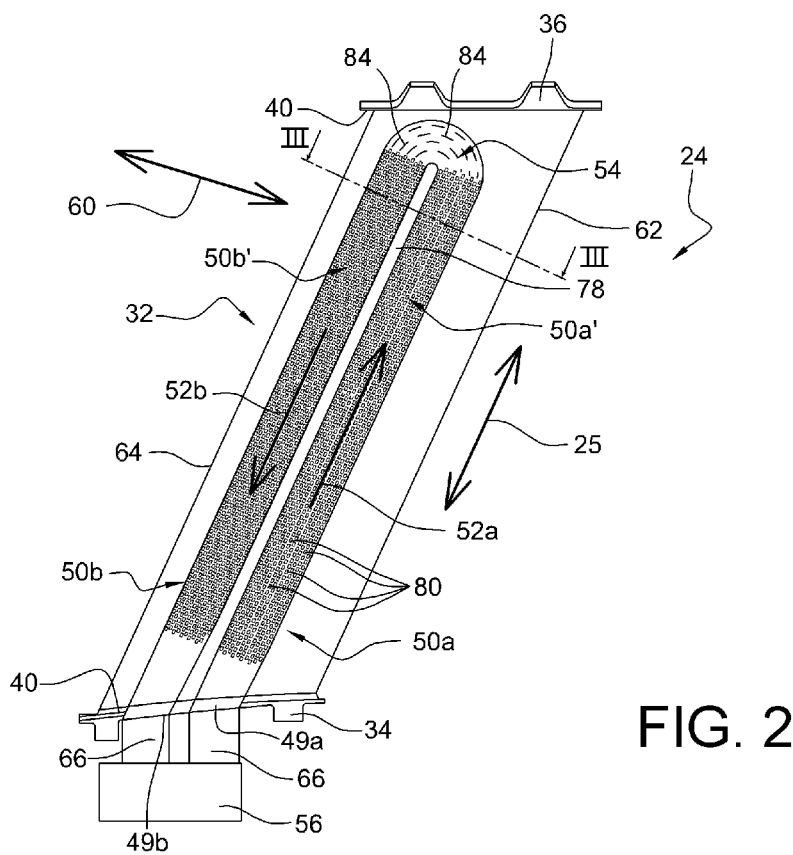
FIG. 2 represents an enlarged more detailed view of an outlet guide vane part of the turbojet engine shown in the preceding figure.
Figure 3:
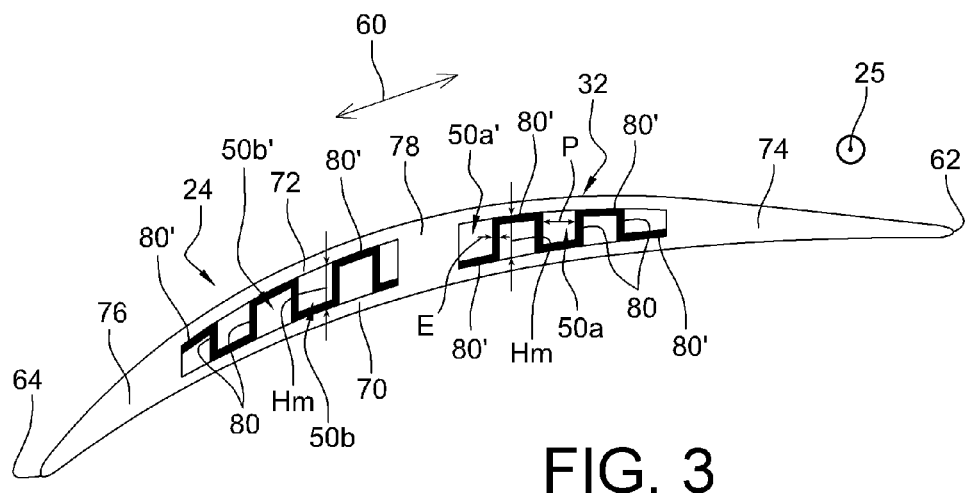
FIG. 3 is a sectional view taken along the line III-III of FIG. 2.
Figure 3A:
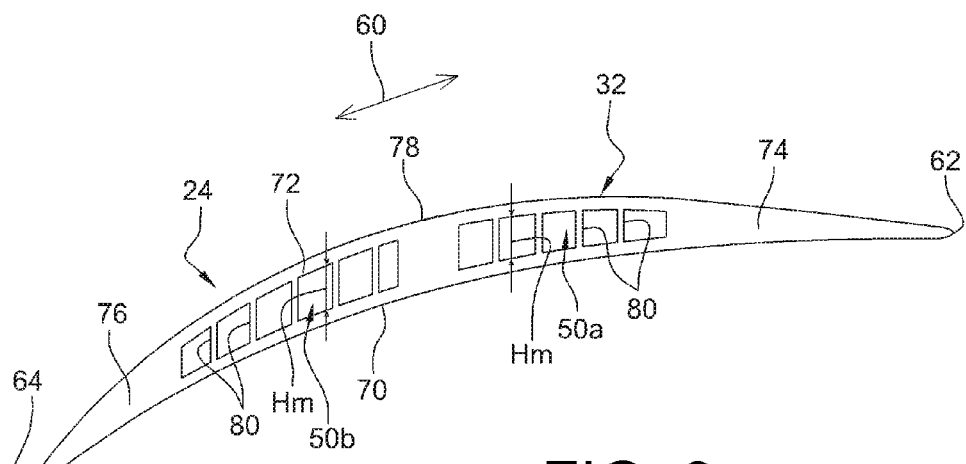
FIG. 3a is a view similar to that of FIG. 3, according to an alternative embodiment.

Referring now to FIGS. 2 to 3a, there will be described one of the outlet guide vanes 24, according to a first preferred embodiment of the invention. In this regard, it is noted that the invention as will be described below can be applied to all the vanes 24 of the stator ring centered on the axis 3, or only to some of these vanes.

The vane 24 may be of strictly radial orientation as in FIG. 1, or it may be slightly inclined axially as shown in FIG. 2. In all cases, it is preferably straight in a side view as shown in FIG. 2, while extending in a spanwise direction 25 or radial direction of the vane.

The outlet guide vane 24 includes an aerodynamic part 32 which corresponds to its central part, that is to say the one exposed to the secondary flow. On either side of this aerodynamic part 32 used to straighten the flow coming out of the fan, the vane 24 includes respectively a root 34 and a tip 36.

The root 34 is used to fasten the vane 24 on the low-pressure compressor casing, while the tip is used to fasten the same vane on the outer shroud extending the fan casing. In addition, the vane 24 comprises at its root and its tip, platforms 40 used to reconstruct the secondary flow path between the vanes 24, in the circumferential direction.

The aerodynamic part 32 of the vane, without its heat conduction matrices which will be described below, is for example made in one-piece, obtained for example by additive manufacturing called 3D printing or direct manufacturing. The additive manufacturing of the aerodynamic part 32 is for example carried out by any one of the following techniques:
  selective laser melting (SLM) or electron beam melting (EBM);
  selective laser sintering (SLS) or electron beam melting;
  any other type of powder solidification technique under the action of an energy source ranging from medium to high power, the principle being to melt or sinter a metal powder bed by laser beam or electron beam.

The powder used is based on aluminum or titanium, or based on another metal material or any other material having satisfactory heat conduction characteristics.

The aerodynamic part 32 of the vane could nevertheless be made using more conventional techniques, making it possible to reveal a hollow portion in which the matrix would then be introduced, before placing a closure plate for example by welding, gluing or brazing.

In addition, the manufacture of the single piece may comprise the root 34, and/or the tip 36 and/or the platforms 40, without departing from the context of the invention.

The aerodynamic part 32 is equipped with two interior passages 50a, 50b substantially parallel to each other, and parallel to the spanwise direction 25. More specifically, it is a first lubricant cooling interior passage 50a which extends along a first main flowing direction 52a of the lubricant. This direction 52a is substantially parallel to the spanwise direction 25, and has a direction extending from the root 34 to the tip 36. Similarly, there is provided a second lubricant cooling interior passage 50b which extends along a second main flowing direction 52b of the lubricant within this passage. This direction 52b is also substantially parallel to the spanwise direction 25, and has a reverse direction from the tip 36 to the root 34. In the embodiment considered, the first passage 50a is therefore intended to be traversed radially outwards by the lubricant, while the second passage 50b is provided to be traversed radially inwards. To ensure the passage from one to the other, in the vicinity of the tip 36, the outer radial ends of the two passages 50a, 50b are fluidly connected by a bent area 54 also called bend, which extends over substantially 180°. This bent area 54, which is specific to the present invention and which will be detailed below, corresponds to a recess formed in the aerodynamic part 32, and equipped with specific means for guiding the lubricant.

The inner radial ends of the two passages 50a, 50b are in turn connected to the lubricant circuit, schematized by the element 56 in FIG. 2. This circuit comprises in particular a pump (not represented), making it possible to apply to the lubricant the desired direction of circulation within the passages 50a, 50b, namely the introduction of the lubricant through the inner radial end of the first passage 50a, and the extraction of the lubricant through the inner radial end of the second passage 50b. Fittings 66 ensure fluid communication between the inner radial ends of the passages 50a, 50b and the circuit 56, these fittings 66 passing through the root 34.

The two passages 50a, 50b and the bent area 54 have together a general U-shape, with the first passage 50a and the second passage 50b being offset from each other along a transverse direction 60 of the vane substantially orthogonal to the spanwise direction 25. To optimize at best the heat exchanges, the first passage 50a is located on the side of a trailing edge of the vane 24, while the second passage 50b is located on the side of a leading edge 64. However, a reverse situation can be retained, without departing from the context of the invention.

The aerodynamic part 32 of the outlet guide vane 24 includes an intrados wall 70, an extrados wall 72, a solid area 74 connecting the two walls 70, 72 in the vicinity of the trailing edge 62, a solid area 76 connecting the two walls 70, 72 in the vicinity of the leading edge 64, as well as a central solid area 78. This latter area 78 connects the two walls 70, 72 at a substantially central portion thereof, along the direction of the vane chord. It is also used as a structural reinforcement and extends from the root 34 to the bend 54, while the solid areas 74, 76 extend substantially over the entire length of the part 32, along the spanwise direction 25. The first passage 50a is formed between the walls 70, 72 and between the solid areas 74, 78, while the second passage 50b is formed between the walls 70, 72 and between the solid areas 76, 78. The intrados and extrados walls 70, 72 have, with regard to the passages 50a, 50b they delimit, substantially constant thicknesses. On the other hand, the passages 50a, 50b extend transversely along the direction 60 by presenting a variable height between the two walls 70, 72. Alternatively, these passages could have a constant height, and the two walls 70, 72 would then preferentially adopt a variable thickness to obtain the aerodynamic profile of the vane.

The two lubricant cooling interior passages 50a, 50b have the particularity of integrating heat conduction means preferably comprising walls and/or fins 80. In FIG. 3, these means take the form of heat conduction matrices, in particular provided with main heat transfer fins and also called convection matrices. These matrices 50a', 50b' are inserted into the interior passages 50a, 50b. By way of example, each matrix 50a', 50b' comprises rows of main heat transfer fins 80 succeeding each other along the spanwise direction 25. The main fins 80 are locally arranged substantially orthogonal to the intrados and extrados walls 70, 72. In addition, they extend each parallel to the first direction 52a, these fins being spaced from each other along the same first direction 52a, as well as along the transverse direction 60. They present an average height Hm, between the two walls 70, 72, in the order of 4 to 8 mm. Their thickness E, along the transverse direction 60, presents a preferably constant value comprised preferably between 0.5 and 20 mm, while their length along the direction 52a has a preferably constant value comprised between 1 and 40 mm. Furthermore, the spacing/pitch "P" between the fins 80 along each of the two directions 52a, 60 are for example in the order of 2 to 4 mm.

The fins 80 may be arranged in a staggered manner, with a density for example of about 3 fins/cm². More generally, the density is comprised for example between about 0.2 and 5 fins/cm² on average.

Furthermore, each row comprises junction fins 80' each connecting two main fins 80 directly consecutive along the transverse direction 60. The junction fins 80' are arranged substantially orthogonal to the main fins 80, by lying flat on the intrados wall 70 or on the extrados wall 72. More specifically, the fins of the same row are alternately in internal contact with the intrados wall 70, and in internal contact with the extrados wall 72. Each row thus forms, with all of its main fins 80 and of its junction fins 80', a transverse structure in the general form of crenellations.

Once made, each matrix 50a', 50b' is inserted into its associated passage 50a, 50b, from the root 34 of the vane manufactured in one-piece. The insertion is performed via an introduction orifice 49a, 49b formed through the same vane root 34, and having a section substantially identical to that of the passages 50a, 50b. These introduction orifices 49a, 49b, then open into the fittings 66 leading to the circuit 56. A solution with caps could also be used to partially seal the introduction orifices 49a, 49b, after insertion of the matrices in the passages. In this case, the fittings 66 of smaller section would fit to the caps, at a lubricant circulation channel formed through each of these caps.

Each heat conduction matrix 50a', 50b' extends over all or part of the radial length of its associated passage 50a, 50b. Preferably, more than 80% of the radial length of each passage 50a, 50b is occupied by its corresponding matrix 50a', 50b'.

Alternatively, as seen in FIG. 3a, the fins 80 can be made in one-piece by additive manufacturing with the intrados and extrados walls 70, 72 they connect.

Figure 4:
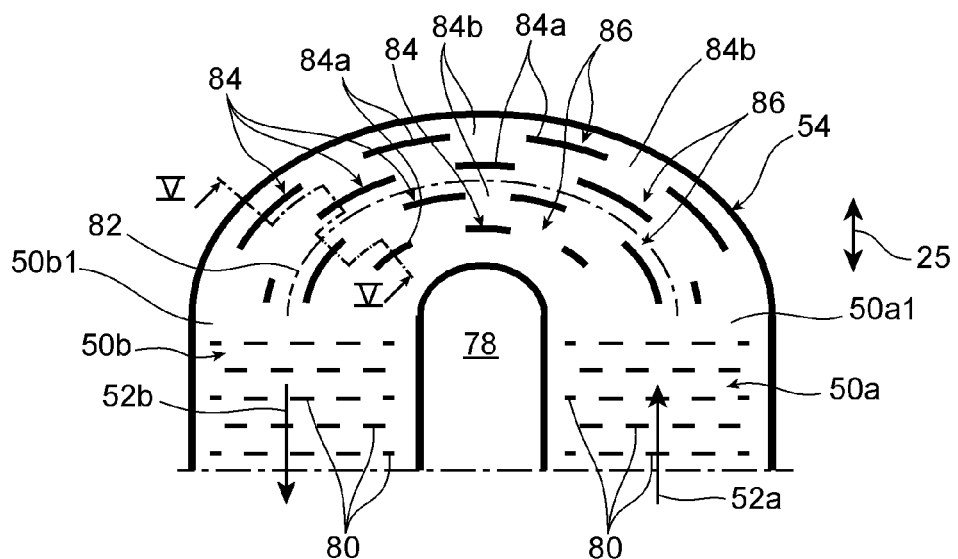
FIG. 4 is an enlarged view of that of FIG. 2, showing more specifically the bent area.
Figure 5:
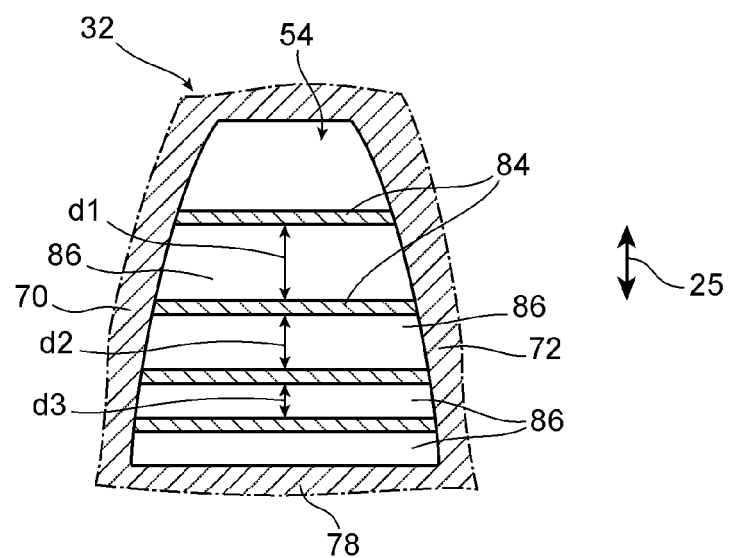
FIG. 5 is a sectional view taken along the line V-V of FIG. 4.

Referring now to FIGS. 4 and 5, the bent area 54 is represented in more detail. This area 54, generally U-shaped and thus ensuring a substantially 180° turn for the lubricant, extends between an end 50a1 of the first passage 50a, and an end 50b1 of the second interior passage 50b. It is also delimited by the intrados 70 and extrados 72 walls, as well as by the central solid area 78. Its cross-section can be reduced while extending towards the tip of the vane, but there is preferably no break in the section between the ends of the branches of the U-shape of the bent area 54, and the ends 50a1, 50b1 of the interior passages. In the embodiment considered, the end 50a1 of the first passage 50a is a lubricant output end, and the end 50b1 of the second interior passage 50b is a lubricant input end.

The bent area 54 extends along a curved generatrix 82 in the form of a semicircle or an oval or any other similar form. The generatrix 82 can here be assimilated to a median line of the bent area, following the curvature thereof. One of the peculiarities of the invention lies in the fact that this bent area 54 is internally equipped with one or more lubricant guide(s) 84 which extend each substantially parallel to the curved generatrix 82, that is to say having a curvature similar to the overall curvature of the bent area 54.

Each lubricant guide 84 has the shape of a wall having a first end facing the lubricant output end 50a1 of the first passage 50a, as well as a second end facing the lubricant input end 50b1 of the second passage 50b. Each wall 84 extends for example over a corresponding length ranging from 75 to 100% of the total length of the bent area 54, along the direction of the curved generatrix 82.

By being parallel, these guides 84 define therebetween lubricant passage channels 86 which therefore extend also parallel to the curved generatrix 82. Two channels 86 are also defined between the body of the aerodynamic part 32 and the two guides 84 located at the ends of the bent area, along the direction 25. The spacing distances d1, d2, d3 between the guides 84 may vary, in particular to locally adapt to the thickness of the bent area and ensure that the channels 86 all have substantially equivalent sections in terms of surface area. This leads to a better balancing of the lubricant flow rates in each of the passage channels 86, between the two interior passages 50a, 50b of the vane. By way of indicative example such as the one represented in FIG. 5, if the thickness of the area 54 between the intrados and extrados walls 70, 72 increases while extending radially inwards, then the referenced spacing distances d1, d2 and d3 change in a decreasing manner. In any case, the density and the spacing of the guides can be adapted according to the encountered needs, so as to best guide the lubricant between the two passages 50a, 50b. In this regard, it is noted that the number of lubricant guides 84 is for example in the order of 4 or 5, thus forming a number of channels 86 of 5 or 6. The thickness of each guide 84 is in turn in the order of 1 to 5 mm. Depending on the desired number of channels, in particular depending on the mechanical stresses and/or on the method of manufacture implemented, the thickness of the guides may range from 15 to 20 mm.

In order to reinforce the mechanical strength of the bent area and to increase the heat exchanges between the lubricant and the air, each wall-shaped guide 84 connects the intrados wall 70 to the extrados wall 72. Even more preferentially, the guides 84 are made in one-piece with the other elements of the aerodynamic part 32, preferably by additive manufacturing.

In addition, to improve convective heat exchanges, each guide 84 may be in the form of several wall segments 84a spaced from each other by interruptions 84b, forming free spaces between these segments 84a. These interruptions 84b promote the wetting of the wall segments 84a without generating harmful disturbances on the flowing of the lubricant.

The section of these guides or guide segments may be of the regular elongated type as represented in the figures, but may alternatively have oblong profiles, as a diamond generally oriented along the direction of the flow, as a NACA-type profile with a flaring widening in the direction of the flow, etc.

For each guide 84, the number of segments 84a can be comprised between 2 and 40. Preferably, the length of the wall segments 84a is greater than that of the interruptions 84b, even if a converse solution could be adopted, without departing from the context of the invention.

To further improve the convective exchanges, it is preferably provided that the wall segments 84a of the various guides 84 succeeding each other along the direction 25 are arranged in a staggered manner as seen in FIG. 4.

Figure 6:
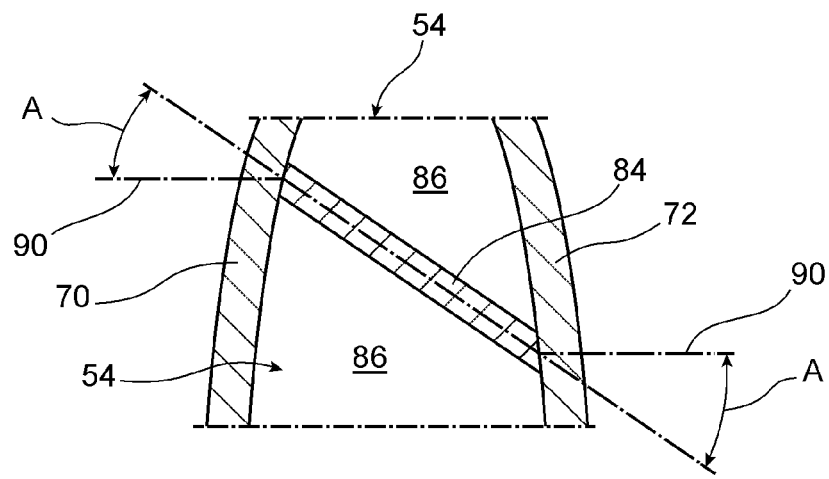
FIG. 6 is a view similar to that of FIG. 5, according to an alternative embodiment.

FIG. 5 represents lubricant guides 84 oriented substantially straight relative to the intrados 70 and extrados walls 72, but to facilitate the additive manufacturing of the assembly, these guides can be inclined. This alternative is represented in FIG. 6, showing in cross-section one of the guides 84 of the bent area, with the wall inclined locally by an angle A with respect to a normal 90 to each of the intrados 70 and extrados 72 walls. This angle A is for example comprised between 20 and 60°, and in particular between 30 and 55°.

Figure 7:
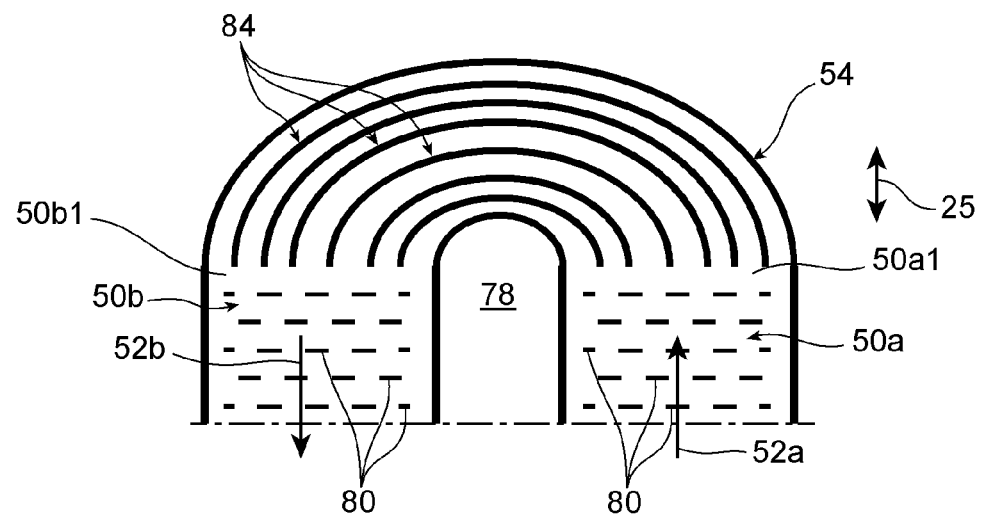
FIGS. 7 to 9 are views similar to the view of FIG. 4, according to alternative embodiments.
Figure 8:
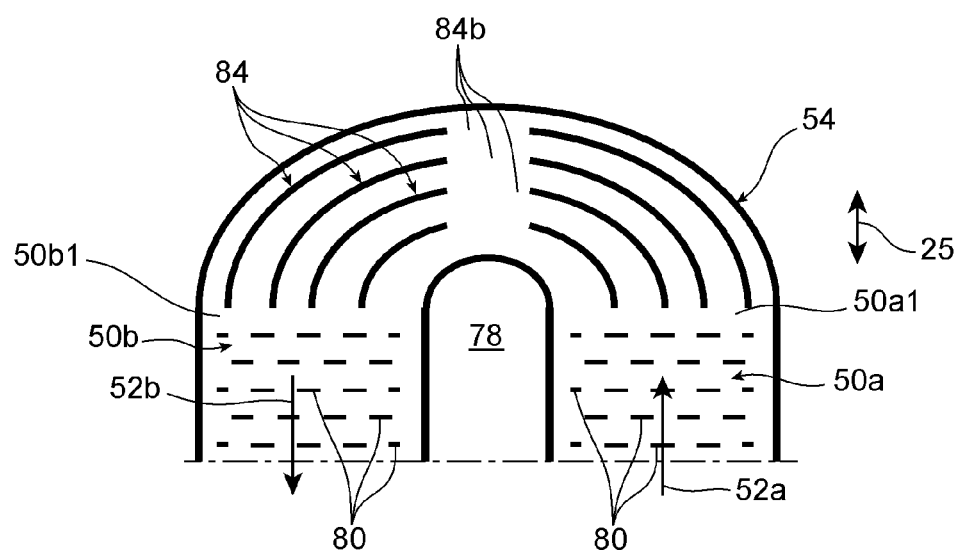
Figure 9:
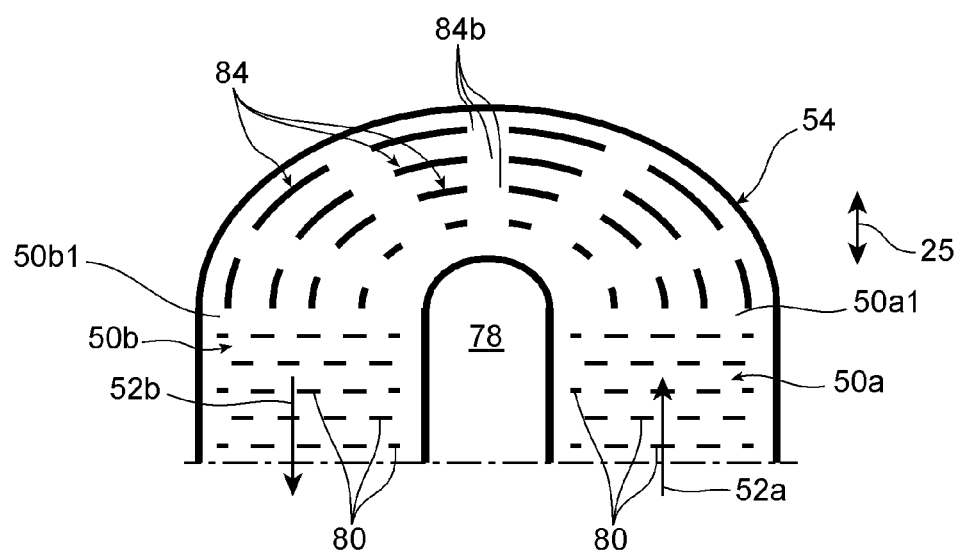

The following figures show possible alternative embodiments, in which the guides 84 are of different shapes. In FIG. 7, the guides are continuous, i.e. they do not present interruptions. In FIG. 8, a single interruption 84b is provided by the guide 84, preferably at the bottom of the U-shape to facilitate the discharge of the powders in case of additive manufacturing. Finally, in FIG. 9, the guides 84 are provided with several interruptions and with several wall segments, with the segments 84a that are no longer arranged in a staggered manner but distributed in rows.

Returning to FIG. 2, during the operation of the turbomachine, the lubricant is introduced into the first interior passage 50a, in the first direction 52a extending radially outwards. At this point, the lubricant has a high temperature. A heat exchange is then carried out between the one conforming to the first heat conduction matrix, and the secondary flow conforming to the outer surface of the intrados and extrados walls 70, 72 carrying these fins. The lubricant, after transiting through the bent area 54 in which it is cooled in particular thanks to the lubricant guides 84, enters the second passage 50b. In the latter, it undergoes a similar cooling, always by heat exchange with the secondary air flow and by circulating along the second main flowing direction 52b, through the second heat conduction matrix. Then, the cooled lubricant is extracted from the vane 24, and redirected by the closed circuit 56 towards the elements to be lubricated.

Of course, various modifications may be made by those skilled in the art to the invention that has just been described, only by way of non-limiting examples. In particular, it is noted that in the non-illustrated case of the inlet guide vanes for straightening the air flow upstream of the fan, these vanes are arranged throughout the whole air flow of the fan around a non-rotating air intake cone, the roots of the vanes then being connected to this stationary air intake cone.

Figure 10:
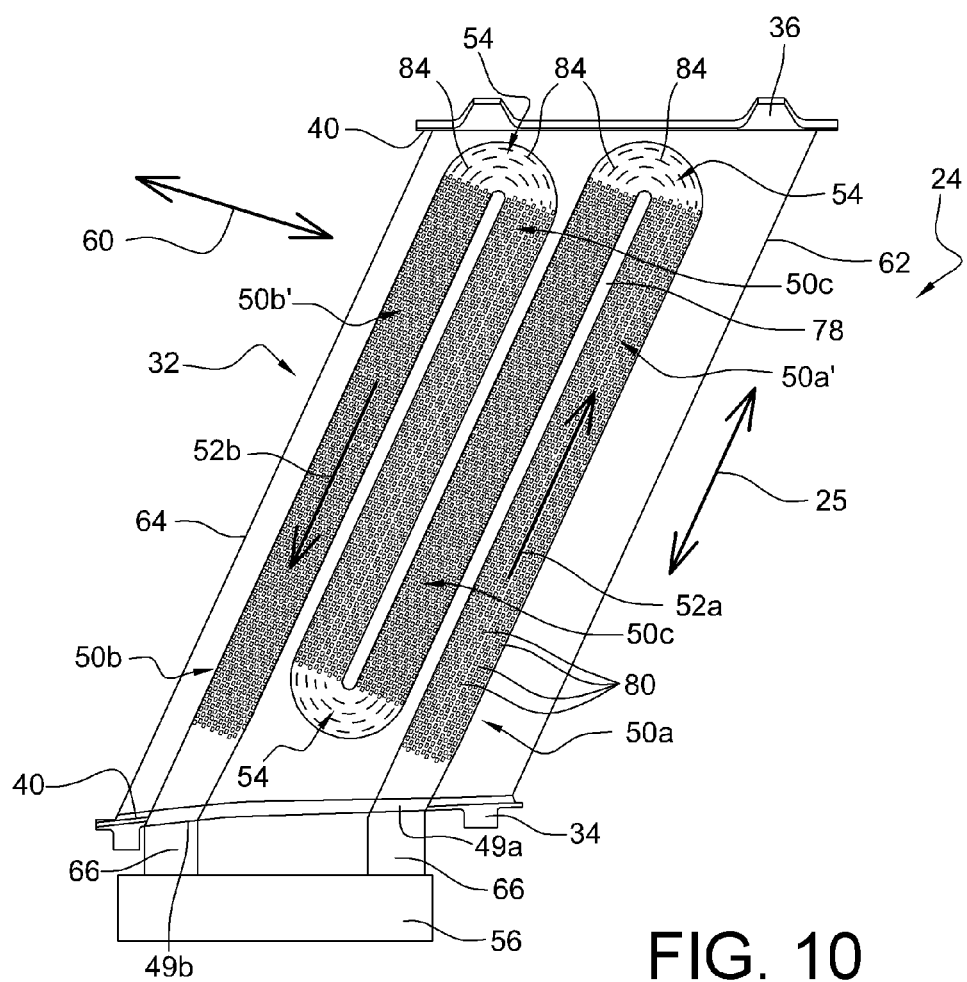
FIG. 10 is a figure similar to that of FIG. 3, according to an alternative embodiment.

Also, the invention is not limited to the cases where the vane incorporates only two passages 50a, 50b, a greater number of passages can indeed be adopted, for example three or four passages 50a, 50b, 50c as on the alternative embodiment shown in FIG. 10. In this assumption, bent areas 54 according to the invention are preferably arranged between the passages 50a, 50b, 50c directly consecutive in the direction of flow of the lubricant.

What is claimed is:

1. A guide vane (24) intended to be arranged in all or part of an air flow of a bypass aircraft turbomachine fan (15), the guide vane (24) comprising:
    a root (34);
    a tip (36);
    an intrados wall (70);
    an extrados wall (72); and
    an aerodynamic flow straightening part (32) arranged between the root (34) and the tip (36) of the guide vane (24), said aerodynamic flow straightening part (32) including a first lubricant cooling interior passage (50a), second lubricant cooling interior passage (50b), and heat transfer means (80) arranged in the first lubricant cooling interior passage (50a) and second lubricant cooling interior passage (50b), the first lubricant cooling interior passage (50a) extending along a first main flowing direction (52a) of lubricant from the root (34) to the tip (36), the second interior passage (50b) extending along a second main flowing direction (52b) of the lubricant from the tip (36) to the root (34) of the vane, said first lubricant cooling interior passage (50a) and second lubricant cooling interior passage (50b) being partly delimited by the intrados wall (70) and the extrados wall (72) of the guide vane (24),
    wherein the aerodynamic flow straightening part (32) comprises a bent area (54) connecting one end (50a1) of the first lubricant cooling interior passage (50a) to one end (50b1) of the second lubricant cooling interior passage (50b), the bent area (54) extending along a curved generatrix (82) and being partly delimited by the intrados wall (70) and the extrados wall (72) of the guide vane (24),
    wherein the aerodynamic flow straightening part (32) comprises at least one lubricant guide (84) arranged within the bent area 54 between the intrados wall (70) and the extrados wall (72) of the guide vane (24), and
    wherein each lubricant guide (84) follows a curvature of the curved generatrix (82).

2. The guide vane (24) according to claim 1, wherein each lubricant guide (84) is a wall having a first end facing the one end (50a1) of the first lubricant cooling interior passage (50a), and a second end facing the one end (50b1) of the second lubricant cooling interior passage (50b).

3. The guide vane (24) according to claim 2, wherein each lubricant guide (84) includes, between its first end and second end, two wall segments (84a) and a wall interruption (84b) forming a space separating the two wall segments (84a).

4. The guide vane (24) according to claim 2, wherein each lubricant guide (84) includes, between its first end and second end, a plurality of wall segments (84*a*) and a plurality of wall interruptions (84*b*), each wall interruption (84*b*) forming a space separating two associated wall segments (84*a*) of the plurality of wall segments (84*a*).

5. The guide vane according to claim 4, wherein the at least one lubricant guide (84) comprises two lubricant guides (84) directly consecutive along a spanwise direction (25) of the guide vane (24), wherein the plurality of wall segments (84*a*) of the two lubricant guides (84) are arranged in a staggered manner.

6. The guide vane (24) according to claim 4, wherein the number of wall segments (84*a*) is less than or equal to 40.

7. The guide vane (24) according to claim 1, wherein the at least one lubricant guide (84) comprises a plurality of lubricant guides (84) that define therebetween lubricant passage channels (86), wherein the plurality of lubricant guides (84) are spaced from each other along spacing distances (d1, d2, d3), at least two of the spacing distances (d1, d2, d3) being different from each other.

8. The guide vane (24) according to claim 1, wherein each lubricant guide (84) is a wall connecting the intrados wall (70) to the extrados wall (72), wherein in any cross-section of the bent area (54), said wall is inclined locally with respect to a normal (90) to each of the intrados (70) and extrados (72) walls.

9. The guide vane (24) according to claim 1, characterized in that the number of the at least one lubricant guide (84) is comprised between 1 and 10.

10. An aircraft turbomachine (1) comprising a plurality of guide vanes (24) according to claim 1, arranged downstream or upstream of a fan (15) of the turbomachine, said vanes (24) having preferably a structural function.

11. The aircraft turbomachine (1) according to claim 10, wherein the aircraft turbomachine (1) is a turbojet engine.

12. The guide vane (24) according to claim 1, wherein each lubricant guide extends parallel to the curved generatrix (82) of the bent area (54).

* * * * *